United States Patent
Shirota et al.

(10) Patent No.: US 11,732,153 B2
(45) Date of Patent: Aug. 22, 2023

(54) COATING LIQUID COMPOSITION AND PROCESS FOR PRODUCING ARTICLE PROVIDED WITH FILM USING IT

(71) Applicant: AGC Inc., Chiyoda-ku (JP)

(72) Inventors: Naoko Shirota, Chiyoda-ku (JP); Miyako Sasaki, Chiyoda-ku (JP); Takefumi Abe, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 402 days.

(21) Appl. No.: 16/047,527

(22) Filed: Jul. 27, 2018

(65) Prior Publication Data

US 2018/0371284 A1    Dec. 27, 2018

Related U.S. Application Data

(63) Continuation of application No. PCT/JP2017/004977, filed on Feb. 10, 2017.

(30) Foreign Application Priority Data

Feb. 24, 2016  (JP) .................................. 2016-033471

(51) Int. Cl.
| | |
|---|---|
| *C09D 127/12* | (2006.01) |
| *B41M 1/04* | (2006.01) |
| *B41M 1/10* | (2006.01) |
| *B41M 1/12* | (2006.01) |
| *C09D 201/06* | (2006.01) |
| *C09D 201/04* | (2006.01) |
| *C09D 11/10* | (2014.01) |
| *C09D 7/20* | (2018.01) |
| *B41M 1/06* | (2006.01) |
| *C09D 7/40* | (2018.01) |

(52) U.S. Cl.
CPC ............. *C09D 127/12* (2013.01); *B41M 1/04* (2013.01); *B41M 1/06* (2013.01); *B41M 1/10* (2013.01); *B41M 1/12* (2013.01); *C09D 7/20* (2018.01); *C09D 7/40* (2018.01); *C09D 11/10* (2013.01); *C09D 201/04* (2013.01); *C09D 201/06* (2013.01)

(58) Field of Classification Search
None
See application file for complete search history.

(56) References Cited

U.S. PATENT DOCUMENTS

| | | | | |
|---|---|---|---|---|
| 5,510,406 A | * | 4/1996 | Matsuo ................ | C09D 145/00 524/544 |
| 2002/0109903 A1 | | 8/2002 | Kaeriyama | |
| 2004/0137361 A1 | * | 7/2004 | French .................... | C08K 5/02 430/270.1 |
| 2015/0259558 A1 | | 9/2015 | Mugisawa et al. | |

FOREIGN PATENT DOCUMENTS

| | | | | |
|---|---|---|---|---|
| JP | 4-366145 | | 12/1992 | |
| JP | 6-322213 | | 11/1994 | |
| JP | 7-254665 | | 10/1995 | |
| JP | 11167030 A | * | 6/1999 | ............. G02B 1/046 |
| JP | 2954636 B2 | | 9/1999 | |
| JP | 11-349888 | | 12/1999 | |
| JP | 2000-193808 | | 7/2000 | |
| JP | 2002-189178 | | 7/2002 | |
| JP | 2004285361 A | * | 10/2004 | |
| JP | 2008-4817 | | 1/2008 | |
| JP | 2014-70100 | | 4/2014 | |
| WO | WO 2015/002204 A1 | | 1/2015 | |

OTHER PUBLICATIONS

Barlow, "The Reactions of Highly Fluorinated Organic Compounds. Part II. Reactions of Perfluorodicyclohexyl and Perfluoro(isopropylcyclohexane)", J. Chem. Soc., 1952, 4695-4698 (Year: 1952).*
Machine translation of JP H11167030 A, retrieved Dec. 2022 (Year: 2022).*
International Search Report dated Mar. 14, 2017 in PCT/JP2017/004977, filed on Feb. 10, 2017 (with English Translation).

* cited by examiner

*Primary Examiner* — Nicole M. Buie-Hatcher
(74) *Attorney, Agent, or Firm* — Oblon, McClelland, Maier & Neustadt, L.L.P.

(57) ABSTRACT

To provide a coating liquid composition containing a fluororesin, whereby a film excellent in the surface flatness can be formed by a plate printing method. A coating liquid composition comprising a fluororesin having an aliphatic ring in the main chain and a fluorinated solvent, wherein the fluorinated solvent has a boiling point of at least 185° C., and the composition has a viscosity of at most 1,000 mP·s at 25° C.

20 Claims, No Drawings

COATING LIQUID COMPOSITION AND PROCESS FOR PRODUCING ARTICLE PROVIDED WITH FILM USING IT

TECHNICAL FIELD

The present invention relates to a coating liquid composition suitable to form a film by a plate printing method and a process for producing an article provided with a film, in which the coating liquid composition is used.

BACKGROUND ART

It is expected to use fluororesins in various fields, utilizing their excellent properties (such as the electric insulating property, the water/oil repellency and the chemical resistances).

A spin coating or dip coating (immersion method) is general as a method for coating a fluororesin, however, a screen printing method is also known (Patent Document 1, etc.). Patent Document 1 discloses an example of applying a composition comprising a fluororesin and a perfluorotributylamine on an organic transistor layer by a screen printing method, followed by drying to form a sealing layer (solidified film).

PRIOR ART DOCUMENTS

Patent Documents

Patent Document 1: JP-A-2008-4817

DISCLOSURE OF INVENTION

Technical Problem

However, in the case of the plate printing method such as a screen printing method, in which a substrate is coated with a coating liquid through a plate to form a film, fine irregularities are easily formed on a solidified film surface to be obtained, as compared with a plateless printing method such as a spin coating method or a dip coating method, in which a substrate is directly coated with a coating liquid to form a film, because fine irregularities on the surface of the plate are transferred on the coated surface.

Thus, in the case of the coating liquid to be used for forming a film by a plate printing method, it is required to immediately planarize irregularities on a coated surface before drying a coating film applied on a substrate to form a solidified film.

According to knowledges of the present inventors, etc., in the case of the method described in Patent Document 1, the flatness of the coating film surface is insufficient, and fine irregularities tend to remain on a solidified film surface.

As the technique to make the coating film surface flat, there is a method of adding a surface modifier (leveling agent) having a lower surface tension than a coating liquid, however, it is difficult to find an effective surface modifier, since the fluororesin itself has a low surface tension.

The present invention provides a coating liquid composition comprising a fluororesin, whereby a film excellent in the flatness on the surface can be formed by a plate printing method, and a process for producing an article provided with a film, in which the coating liquid composition is used.

Solution to Problem

The present invention provides the coating liquid composition and the process for producing an article provided with a film, which have the following features [1] to [12].

[1] A coating liquid composition comprising a fluororesin having an aliphatic ring in the main chain and a fluorinated solvent, wherein the fluorinated solvent has a boiling point of at least 185° C., and the composition has a viscosity of at most 1,000 mPa·s at 25° C.

[2] The coating liquid composition according to [1], wherein the aliphatic ring is a fluorinated aliphatic ring.

[3] The coating liquid composition according to [1] or [2], wherein the aliphatic ring is a perfluoro-aliphatic ring.

[4] The coating liquid composition according to any one of [1] to [3], wherein the fluororesin is a polymer comprising units based on a cyclic fluorinated monomer, of which at least one carbon atom constituting the ring is a carbon atom constituting a carbon-carbon unsaturated double bond.

[5] The coating liquid composition according to any one of [1] to [3], wherein the fluororesin is a polymer having units formed by cyclopolymerizing a cyclopolymerizable diene-type fluorinated monomer.

[6] The coating liquid composition according to any one of [1] to [5], wherein the fluororesin is a fluorinated polymer having no hydrogen atom bonding to a carbon atom.

[7] The coating liquid composition according to any one of [1] to [6], wherein the fluorinated solvent is at least one member selected from the group consisting of a compound having at least two fluorocycloalkane rings and a fluoroalkyl amine.

[8] The coating liquid composition according to any one of [1] to [7], wherein the fluorinated solvent is a fluorinated solvent having no hydrogen atom bonding to a carbon atom.

[9] The coating liquid composition according to any one of [1] to [8], which is a coating liquid composition to be applied by a plate printing method.

[10] A method of using the coating liquid composition as defined in any one of [1] to [9], in which the coating liquid composition is used for coating in a plate printing method.

[11] A process for producing an article provided with a film, which comprises forming a film of a coating liquid composition on a substrate by a plate printing method using the coating liquid composition as defined in any one of [1] to [9], and then removing the fluorinated solvent from the film.

[12] The process for producing an article provided with a film according to [11], wherein the plate printing method is any one of a flexo printing method, an offset printing method, a gravure printing method or a screen printing method.

Advantageous Effects of Invention

According to the coating liquid composition of the present invention, a film which comprises a fluororesin and is excellent in the flatness of a surface can be formed. The coating liquid composition of the present invention is particularly suitable for forming a film by a plate printing method.

According to the process for producing an article provided with the film of the present invention, a film which comprises a fluororesin and is excellent in the flatness of a surface can be formed.

DESCRIPTION OF EMBODIMENTS

In the present specification, the following terms have the following meanings.

The boiling point of a fluorinated solvent is a value under normal pressure.

The viscosity of a composition is a value measured by an E-type viscometer at 25° C.

The viscosity of a coating liquid composition is a viscosity at the time of using a coating liquid composition contained in a container for a plate printing or the like and is a viscosity immediately after being taken out from the container.

The vapor pressure of a solvent is a value at 25° C.

"Solidified film" means a film containing no solvent and formed by removing the solvent from a film which is formed by applying a coating liquid composition.

"Drying" a coating film means removing a solvent from the coating film containing the solvent by vaporization.

[Coating Liquid Composition]

The coating liquid composition of the present invention (hereinafter referred to also as "present composition") comprises a fluororesin and a fluorinated solvent. Further, the coating liquid composition may contain an optional component.

The present composition is suitable as a coating liquid for forming a film by a plate printing method. For example, the present composition may be preferably used as ink (preferably electrical insulating ink) in a plate printing method.

(Fluororesin)

The fluororesin in the present composition has fluorine atoms and an aliphatic ring in the main chain. The fluororesin in the present composition is preferably a fluorinated polymer having an aliphatic ring in the main chain.

"Having an aliphatic ring in the main chain" means that at least one carbon atom constituting the skeleton ring in the aliphatic ring is a carbon atom constituting the main chain of a fluororesin. The aliphatic ring may have an etheric bond.

The fluororesin in the present composition is preferably a fluorinated polymer which is a polymer of fluorinated monomers having a polymerizable carbon-carbon double bond, and in such a case, the main chain in the polymer comprises carbon atoms constituting the double bond of the monomers. In such a fluorinated polymer, "having an aliphatic ring in the main chain" means that at least one carbon atom constituting the aliphatic ring is a carbon atom constituting the main chain. Hereinafter, the fluorinated polymer will be described.

Fluorine atoms in the fluorinated polymer may bond to carbon atoms constituting the main chain or may bond to carbon atoms in a side chain. The fluorinated polymer preferably has a ring having a structure having a fluorine atom or a fluorine-containing group which bonds to at least a part of carbon atoms constituting the aliphatic ring (namely, fluorinated aliphatic ring). That is, the fluorinated polymer in the present composition preferably has a fluorinated aliphatic ring in the main chain.

Particularly, the fluorinated aliphatic ring preferably has no hydrogen atom bonding to a carbon atom. That is, the fluorinated aliphatic ring is preferably a perfluoro-aliphatic ring.

The fluorinated polymer is a polymer having units based on a fluorinated monomer. The units based on a fluorinated monomer have the aliphatic ring. The units based on a fluorinated monomer may have a moiety other than the aliphatic ring. The fluorinated monomer is preferably a perfluoromonomer (namely, a monomer having no hydrogen atom bonding to a carbon atom). The fluorinated monomer may be a fluorinated monomer having no aliphatic ring or may be a fluorinated monomer which may be cyclopolymerized, in addition to the fluorinated monomer having the aliphatic ring. The after-described diene-type fluorinated monomer is a monomer which forms an aliphatic ring at the time of polymerization and becomes units having the aliphatic ring.

Further, the fluorinated polymer may have units having no aliphatic ring. The monomer to form units having no aliphatic ring is preferably a monomer having a fluorine atom and more preferably a monomer having no hydrogen atom bonding to a carbon atom. The monomer to form units having no aliphatic ring may, for example, be a fluoroolefin such as a fluoroethylene or chlorotrifluoroethylene or a perfluoro(alkyl vinyl ether). Particularly, tetrafluoroethylene is preferred.

The fluorinated polymer is preferably the following fluorinated cyclic polymer (I) or fluorinated cyclic polymer (II). "Cyclic polymer" means a polymer having a cyclic structure.

Fluorinated cyclic polymer (I): polymer having units based on a cyclic fluorinated monomer of which at least one carbon atom constituting a ring is a carbon atom constituting a carbon-carbon unsaturated double bond.

The aliphatic ring in the cyclic fluorinated monomer is preferably a ring having an etheric oxygen atom, and the monomer preferably has no hydrogen atom bonding to a carbon atom. The cyclic fluorinated monomer is a monomer having a double bond between adjacent carbon atoms constituting a ring (for example, the following formulae (a-1) to (a-5)) or a monomer having a double bond between a carbon atom constituting a ring and a carbon atom at the outside the ring (for example, the following formulae (a-6) and (a-7)). The proportion of units based on the cyclic fluorinated monomer in the fluorinated cyclic polymer (I) is preferably at least 20 mol %, more preferably at least 40 mol % and may be 100 mol %, per the total units. Units other than the units based on the cyclic fluorinated monomer are preferably units based on tetrafluoroethylene.

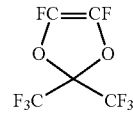

(a-1)

(a-2)

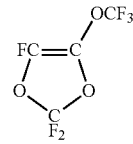

(a-3)

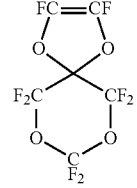

(a-4)

-continued

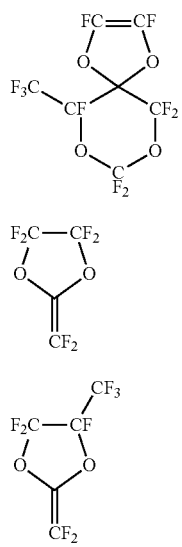

(a-5)

(a-6)

(a-7)

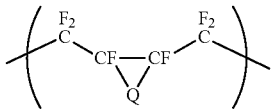

(II-1)

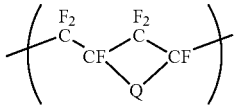

(II-2)

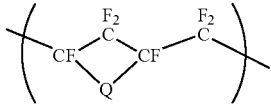

(II-3)

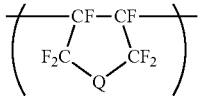

(II-4)

Fluorinated cyclic polymer (II): polymer having units formed by cyclic polymerization of cyclopolymerizable diene-type fluorinated monomers (for example, a monomer represented by the following formula (b)).

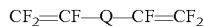

$CF_2=CF—Q—CF=CF_2$ (b)

where Q is a $C_{1-5}$, preferably $C_{1-3}$ perfluoroalkylene group which may have an etheric oxygen atom, of which a part of fluorine atoms may be substituted by halogen atoms other than fluorine atom and which may have a branch. The halogen atom other than fluorine may, for example, be a chlorine atom or a bromine atom.

Q is preferably a perfluoroalkylene group having an etheric oxygen atom. In such a case, the etheric oxygen atom in the perfluoroalkylene group may be present at one terminal of the group, at both terminals or between carbon atoms in the group. The etheric oxygen atom is preferably present at one terminal of the group from the viewpoint of excellent cyclic polymerization property. The monomer represented by the formula (b) may, for example, be perfluoro (3-butenyl vinyl ether), perfluoro(allyl vinyl ether), perfluoro(3,5-dioxaheptadiene) or perfluoro(3,5-dioxa-4,4-dimethylheptadiene). Particularly, perfluoro(3-butenyl vinyl ether) is preferred.

The unit formed by cyclopolymerization of the monomers represented by the formula (b) may be the following formulae (II-1) to (II-4). As mentioned in the following formulae, four carbon atoms constituting two double bonds constitutes the main chain of a polymer (formulae (II-1) to (II-3)), or only two carbon atoms constituting two double bonds at a terminal constitute the main chain of a polymer (formula (II-4)). Further, among four carbon atoms constituting two double bonds, two carbon atoms with Q constitutes an aliphatic ring (formula (II-1)), three carbon atoms with Q constitutes an aliphatic ring (formula (II-2)) and (formula (II-3)), or four carbon atoms with Q constitutes an aliphatic ring (formula (II-4)).

Further, the aliphatic ring containing Q easily forms a 5-membered ring and a 6-membered ring, and a polymer formed by cyclic polymerization becomes a polymer having units having a 5-membered ring or a 6-membered ring as the main units.

The fluorinated cyclic polymer (II) is preferably a polymer of cyclopolymerizable diene-type fluorinated monomers. As described above, even in a case of one type monomers, units having a different structure may be formed in some cases, and thereby, a polymer having a copolymerization structure having different units may be formed from one type diene-type fluorinated monomers.

Further, the fluorinated cyclic polymer (II) may be a copolymer of the above-mentioned diene-type fluorinated monomers and other monomers. Such other monomers may, for example, be the above-mentioned cyclic fluorinated monomer, fluoroolefin or a perfluoro(alkyl vinyl ether). In the case of the copolymer having units based on another monomer, the proportion of units based on another monomer is preferably at most 60 mol %, more preferably at most 40 mol %, per the total units in the copolymer.

The mass average molecular weight of the fluorinated polymer having an aliphatic ring in the main chain is preferably at least 10,000, particularly preferably at least 30,000, from the viewpoint of the excellent film forming property. From the viewpoint of the solubility in a fluorinated solvent, the mass average molecular weight is preferably at most 1,000,000, more preferably at most 800,000, particularly preferably at most 500,000.

A commercially available product may be used as the fluorinated polymer having an aliphatic ring in the main chain, and CYTOP (registered trademark, manufactured by Asahi Glass Company, Limited), Teflon AF (registered trademark, manufactured by Du-Pont-Mitsui Fluorochemicals Company, Ltd.), Hyflon AD (registered trademark, manufactured by SOLVAY), etc. may be mentioned.

(Fluorinated Solvent)

The fluorinated solvent in the present invention has a boiling point of at least 185° C. When the boiling point is at least the above lower limit value, a solvent can be suppressed from volatilizing while a coating liquid is exposed to an atmosphere in a step of forming a film. Thus, the flatness of a coating film surface applied on a substrate improves, and the flatness of a solidified film surface is excellent. The boiling point is preferably at least 190° C., more preferably at least 195° C., further preferably at least 200° C., particularly preferably at least 210° C.

In a case where the present composition contains at least two types of fluorinated solvents, the present composition has at least 2 boiling points or has one boiling point as the azeotropic point. In a case where the present composition has at least 2 boiling points, the lower boiling point has to have a value of at least the above-mentioned lower limit value. In the case of azeotropy, the azeotropic point has to be at least the above lower limit value.

The upper limit of the boiling point is not particularly restricted, however, if the boiling point is too high, the molecular weight becomes high, and thereby the viscosity of the fluorinated solvent tends to be high. From the viewpoint of avoiding too high viscosity, the boiling point of the fluorinated solvent is preferably at most 300° C., particularly preferably at most 280° C. In a case where the fluorinated solvents in the present composition have at least 2 boiling points, the higher boiling point preferably has a value of at most the above upper limit value.

The fluorinated solvent in the present composition preferably has at least one type of a fluorinated solvent which dissolves a fluororesin. Further, in order to improve the solubility of a fluororesin, a fluorinated solvent having no hydrogen atom bonding to a carbon atom is preferred.

The vapor pressure of the fluorinated solvent in the present composition at 25° C. is preferably from 0 to 0.1 kPa, more preferably from 0 to 0.05 kPa, particularly preferably from 0 to 0.02 kPa. When the vapor pressure is at most the above upper limit value, the solvent is suppressed from volatilizing while a coating liquid is exposed to a room temperature atmosphere in a step of forming a film.

The fluorinated solvent is preferably at least one member selected from the group consisting of a compound having at least 2 fluorocycloalkane rings (hereinafter referred to also as "multi-ring compound (F)") and a fluoroalkyl amine.

The fluorocycloalkane ring is a ring structure of which at least one part of hydrogen atoms bonding to carbon atoms in a monocyclic cycloalkane ring is substituted by fluorine atoms. The fluorocycloalkane ring is preferably a 4-membered ring, a 5-membered ring or a 6-membered ring.

The fluorocycloalkane ring in the multi-ring compound (F) may be a monocyclic or may form a fused ring. The total of the number of carbons constituting the polycyclic compound (F) is preferably from 10 to 17.

The fluorocycloalkane ring may have a substituent other than a fluorine atom. The substituent is preferably a $C_{1-6}$ fluoroalkyl group of which at least a part (preferably all) of hydrogen atoms is substituted by fluorine atoms, and preferably —$CF_3$.

As specific examples of the polycyclic compound (F), compounds of the following formulae (1) to (10) (hereinafter referred to also as compounds (1) to (10)) may be mentioned. In the formulae, a ring provided with "F" in its inside is a perfluorocycloalkane ring of which all hydrogen atoms other than a substituent are substituted by fluorine atoms.

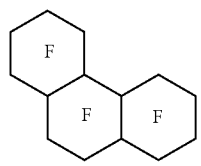
(1)

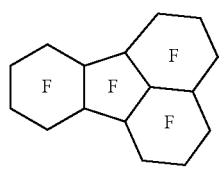
(2)

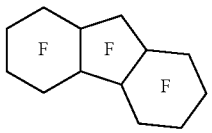
(3)

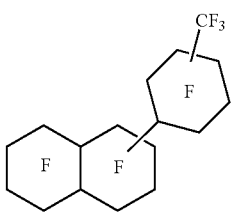
(4)

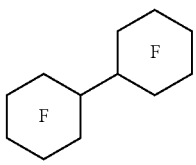
(5)

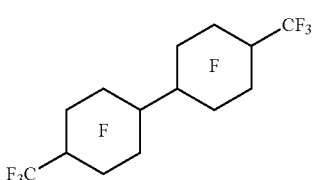
(6)

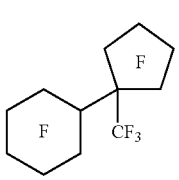
(7)

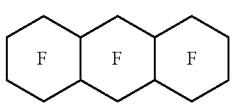
(8)

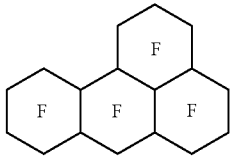
(9)

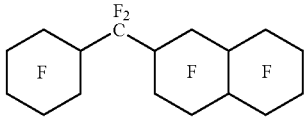
(10)

The polycyclic compound (F) is preferably the following compound.

Compound (1) (boiling point: 215° C., vapor pressure: 0.000856927 kPa)

Compound (2) (boiling point: 244° C., vapor pressure: 0.000220318 kPa)

Compound (3) (boiling point: 194° C., vapor pressure: less than 0.1 kPa)

Compound (10) (boiling point: 260° C., vapor pressure: less than 0.1 kPa)

The fluoroalkyl amine is a compound wherein at least a part (preferably all) of hydrogen atoms bonding to carbon atoms in a monoalkyl amine, a dialkyl amine or a trialkyl amine is substituted by fluorine atoms.

The carbon number of an alkyl group in the fluoroalkyl amine is preferably from 5 to 6. The alkyl group may be linear or branched.

As specific examples of the fluoroalkyl amine, perfluorotripentylamine (boiling point: from 212 to 218° C.), tris (tridecafluorohexyl)amine (boiling point: from 250 to 260° C.), etc. may be mentioned.

Further, the perfluorotributylamine (boiling point: 178° C., vapor pressure; 0.17 kPa) may be mixed with the polycyclic compound (F) so that the azeotropic boiling point would be at least 185° C. for use.

The fluorinated solvent is particularly preferably the compound (1), the compound (2) or perfluorotripentylamine.

Otherwise, a mixed solvent of perfluorotributylamine and the compound (1) is preferred. In the mixed solvent, the content of the perfluorotributylamine is preferably from 1 to 50 mass %, more preferably from 1 to 30 mass %, particularly preferably from 1 to 20 mass %, per the total amount of the perfluorotributylamine and the compound (1).

The present composition may contain a component other than the fluororesin and the fluorinated solvent. The optional component may, for example, be a filler such as silica, a pigment such as titanium dioxide or a stabilizing agent such as a UV light observing agent. Particles such as the filler or the pigment are preferably fine particles, and for example, fine particles having an average particle size of at most 1 μm are preferred.

(Viscosity of Composition)

The present composition is adjusted so that the viscosity would be at most 1,000 mPa·s. The higher the content of the fluororesin in the present composition is, the higher the viscosity of the present composition is. The relationship between the content of the fluororesin and the viscosity of the present composition varies depending on the types of the fluorinated solvent. Even though the content of the fluororesin is the same, the viscosity of the composition tends to be high as the boiling point of the fluorinated solvent becomes high. Accordingly, it is preferred to select the fluorinated solvent of which the boiling point is not too high within the range of at least the above-mentioned lower limit value.

When the viscosity of the present composition is at most the above-mentioned upper limit, the flatness of the coating film surface applied on a substrate is excellent, and the flatness of a solidified film surface is excellent. The viscosity is preferably at most 800 mPa·s, more preferably at most 700 mPa·s, further preferably at most 600 mPa·s, particularly preferably at most 500 mPa·s. The lower limit of the viscosity is not particularly restricted, however, from the viewpoint of easily controlling the film thickness, the viscosity is preferably at least 1 mPa·s, more preferably at least 10 mPa·s, particularly preferably at least 20 mPa·s.

Particularly, in a case where the composition is used in a flexo printing method, the viscosity of the composition is preferably at most 600 mPa·s, more preferably at most 550 mPa·s, particularly preferably at most 500 mPa·s.

The respective contents of the fluororesin and the fluorinated solvent in the present composition are designed so that the present composition would have a viscosity within the above preferred range.

The solid content concentration of the present composition is preferably from 1 to 20 mass %, more preferably from 1 to 15 mass %, particularly preferably from 1 to 10 mass %.

The solid content in the present composition indicates the sum of components other than the solvent in the present composition (mass obtained by deducting the mass of the solvent from the gross mass of the present composition), and the solid content concentration is obtained by the following formula.

Solid content concentration [mass %]=the total mass of components other than the solvent/the gross mass of the present composition×100

Further, the content of the fluororesin is preferably at least 80 mass %, more preferably at least 90 mass %, particularly preferably at least 95 mass %, per the solid content. The content of the fluororesin may be 100 mass %. In a case where the solid content contains an optional component comprising fine particles such as silica, the content of the optional component is preferably at most 20 mass %, more preferably at most 10 mass %, per the solid content.

The solid content in the present composition may also be measured as a non-volatile content obtained by heating the composition at 150° C. for 30 minutes, then heating at 200° C. for 30 minutes and then heating at 250° C. for 60 minutes.

[Plate Printing Method]

The plate printing method is a method of forming a film on a substrate through a plate, and specifically, a flexo printing method, an offset printing method, a gravure printing method and a screen printing method may, for example, be mentioned.

In the flexo printing method, a coating liquid is supplied to an anilox roll, a part of the coating liquid on the anilox roll is transferred on a printing plate of a printing cylinder and transferred to a substrate from the printing plate of the printing cylinder. Fine concave parts (cells) are formed on the entire surface of the anilox roll, and a coating liquid held in the concave parts is transferred to the printing cylinder at a predetermined time.

In the offset printing method, a coating liquid is supplied on a printing plate of a printing cylinder, transferred from the printing plate of the printing cylinder to a blanket and transferred to a substrate from the blanket.

In the gravure printing method, a coating liquid is supplied on a printing plate of a printing cylinder and transferred from the printing plate of the printing cylinder to a substrate.

In the screen printing method, a coating liquid is supplied on a printing plate consisting of a mesh screen, and pressure is applied thereto to apply the coating liquid which has passed through the screen on a substrate.

In the flexo printing method, the offset printing method or the gravure printing method, when a coating liquid is transferred from a printing plate to a substrate, fine irregularities on the surface of the printing plate are transferred on a coating film. Further, in the screen printing method, irregularities derived from the shape of a mesh are transferred on a coating film. That is, in the case of the plate printing method, irregularities are unavoidably transferred on a coating film surface. Thus, it is effective to improve the flatness of a solidified film surface by using the composition of the present invention.

Particularly, in the flexo printing method, a coating liquid is temporarily stored on an anilox roll and then transferred on a printing plate of a printing cylinder. Thus, the coating liquid on the rotating anilox roll is exposed in an atmosphere for a long time. According to the present invention, the volatilization of a solvent, which results during being exposed in the atmosphere can be suppressed, and the flatness of a solidified film surface is improved. Thus, particularly in the flexo printing method, the effect obtained by the present invention is significant.

(Function and Mechanism)

As described above, the plate printing method has a peculiar problem such that irregularities are easily formed on a solidified film surface due to irregularities on a plate surface.

According to the present invention, a solvent having a high boiling point is used, whereby the volatilization of a solvent, which results while a coating liquid is exposed in the atmosphere, can be suppressed, and the viscosity of the coating liquid is adjusted within an appropriate range, whereby the flatness of a coating film surface is improved, and the flatness of a solidified film surface is improved.

Further, not restricted to the plate printing method, in a process of forming a film containing a solvent from a coating liquid, the solvent in the coating liquid tends to volatilize. Thus, such a problem can be overcome in applications in which problems easily result such as the change in the viscosity of a coating liquid is large due to the volatilization of a solvent.

[Process for Producing an Article Provided with a Film]

The process for producing an article provided with a film of the present invention comprises forming a film of the present composition on a substrate by a plate printing method and then removing the fluorinated solvent from the film.

Specifically, the present composition is applied on a substrate by a plate printing method to form a coating film, and the fluorinated solvent is removed from the coating film to form a solidified film.

The coating film is preferably formed under room temperature. For example, the atmospheric temperature is preferably from 15 to 25° C.

The method of removing the solvent in the coating film may, for example, be heating, decompression or a combination method of heating and decompression. Heating under normal pressure is preferred, since defects are not likely to form a solidified film, and the operation is simple.

If the heating temperature is too low, removing the solvent hardly proceeds, and if the heating temperature is too high, the rate of solvent volatilization is too high, and the surface irregular results. Thus, the heating temperature is set within the range where these problems will not result. The heating temperature may be a temperature of at most a boiling point of the fluorinated solvent in the coating film. The upper limit of the heating temperature is not particularly restricted, however, from the viewpoint of suppressing the decomposition of the fluororesin, the heating temperature is preferably at most 250° C.

In a case where the solvent is removed by heating, the heating is preferably carried out by two steps for leveling the coating liquid to obtain a coating film having a smooth surface property. In the first step, the solvent is volatilized, while uniformly leveling the coating liquid on the substrate. The surface property is mostly determined by the first step heating. In the second step, heating is preferably carried out at a higher temperature than the heating temperature in the first step in order to remove the residual solvent as large as possible.

The film may be a film on which a predetermined pattern is formed or a flat film not being patterned. The film thickness is not particularly restricted so long as a film is formed by a plate printing method. For example, the film thickness is preferably from 0.05 to 10 µm, more preferably from 0.05 to 5 µm, particularly preferably from 0.05 to 3 µm.

The substrate may be a substrate consisting of one type of a material or may be a laminate comprising a substrate on which optional films are laminated. The material constituting the substrate may, for example, be glass, plastic (such as a polyethylene terephthalate, a polyethylene naphthalate, a polyethersulfone or a polyimide), a fiber-reinforced composite material (such as glass fiber-reinforced plastic) or silicone.

The article provided with a film may, for example, be a semiconductor device (such as an organic transistor device) comprising as a main body, a laminate comprising a substrate on which a functional layer (such as a semiconductor layer or a conductive layer) is formed, wherein the entire or a part of the main body is provided with a coating layer (such as a sealing layer) of the present com position.

EXAMPLES

Now, the present invention will be described in detail. However, the present invention is not limited to the following Examples. Ex. 1, 2 and 8 are Working Examples, and Ex. 3 to 7 are Comparative Examples.

Materials used in each Ex. and evaluation methods are described below.

[Used Materials]
(Fluorinated Solvent)

The compound (1) (product name: PP11, manufactured by F2 Chemicals)

The compound (2) (product name: PP24, manufactured by F2 Chemicals)

Perfluorotributylamine (product name: CT-solv180, manufactured by Asahi Glass Company, Limited)

Perfluorotripentylamine (manufactured by Tokyo Chemical Industry Co., Ltd.)

(Fluorinated Polymer)

Fluorinated polymer (1): fluorinated cyclic polymer formed by cyclopolymerizing perfluoro(3-butenylvinyl ether), intrinsic viscosity [η] is 0.23 dl/g at 30° C. in perfluoro(2-butyltetrahydrofuran)

[Evaluation Method]
(Evaluation of Flatness of Film Surface)

A coating film was formed under conditions assuming that in the flexo printing method, a coating liquid was held on an anilox roll and then transferred to a printing plate of a printing cylinder, and at the time of transferring the coating liquid from the printing plate to a substrate, fine irregularities on the surface of the printing plate were transferred on the coating film surface, and the coating film was dried by heating. Then, the flatness of the coating film surface was evaluated.

In order to reproduce fine irregularities transferred on a coating film surface under simulation, a bar coater was used. An annealing wire was wound around a round bar without any space in the bar coater, and the coating film surface was scratched with the bar coater to form irregularities. The larger the number of the annealing wire is, the larger the difference in level among irregularities is.

As the time condition of holding the coating liquid on the anilox roll, two conditions of 10 minutes and 30 minutes were employed. The longer the holding time is, the more the volatilization of a solvent proceeds, and thereby the viscosity of a composition becomes high, and the flatness of a coating film surface deteriorates.

First, 300 µL of a composition to be evaluated was mounted on a substrate (made of glass, thickness: 0.7 mm, area: 120 mm×150 mm), and the substrate was coated with the composition by means of a bar coater (No. 3). Then, the substrate was left as it was for 10 minutes or 30 minutes at room temperature (25° C. at relative humidity of 59%), and then irregularities were formed on the surface of the coating film by means of a bar coater (No. 200). Then, the substrate was subjected to heat drying by a hot plate at 100° C. for 90 seconds, and in an oven at 180° C. for 30 minutes, and the difference in level among irregularities of the obtained film surface was measured by means of a contact type profiling system (product name: Dektak XT Stylus Profiler, manufactured by Bruker). As the measurement conditions, measuring distance was 500 μm, and the measuring time was 10 seconds. The smaller the measured value of the difference in level is, the better the flatness of the film surface is. When the difference in level is less than the measurement limitation, the measured value is 0.

Further, in Table 1, the difference in level after being left for 10 minutes at 25° C. at a relative humidity at most 59% is represented by "after being left for 10 minutes", and the difference in level after being left for 30 minutes at 25° C. at a relative humidity of at most 59% is represented by "after being left for 30 minutes".

(Evaluation of Surface Roughness (Pa) of Printed Film)

A substrate (made of glass, thickness: 0.7 mm, area: 150 mm×150 mm) was continuously print-coated with 4 sheets of a composition to be evaluated as dummy printing. Then, as the actual printing, a substrate (made of glass, thickness: 0.7 mm, area: 150 mm×150 mm) was continuously print-coated with 3 sheets. The printing was carried out by means of a flexo printing machine (product name: SmartLabo-III, manufactured by Komura-Tech Co., Ltd.), an anilox roll (type: line number 300 L) and a flexo printing plate (type: line number 400 L, numerical aperture: 30%, halftone dot: 25 μm, manufactured by Komura-Tech Co., Ltd.) at a printing pressure of 150 μm at a printing speed of 18 m/min.

In the actual printing, the third coating film was heated by a hot plate at 70° C. for 1 minute and baked in an oven at 180° C. for 20 minutes to form a printed film. The surface roughness Pa of the surface of the printed film was measured by a contact type profiling system (product name: Dektak XT Stylus Profiler, manufactured by Bruker). As the measuring condition, the measuring distance was 1,000 μm, and the measuring time was 60 seconds.

The halftone dots are round convex parts of convexo-concave shape of the flexo printing plate surface, the number of lines is the number of halftone dots per 1 inch, and the numerical aperture is a proportion of area of the halftone dots in a unit area.

(Variation with Time of Content (Solid Content Concentration) of Fluorinated Polymer Per Composition)

First, the mass of a substrate (thickness: 0.7 mm, area: 120 mm×150 mm) was measured (A g). Then, 300 μL of a composition just prepared was put on the substrate, and the substrate was coated with the composition by means of a bar coater (No. 3), and then the mass of the substrate with the coating film was measured (B g). Then, the mass of the substrate with the coating film after being left at 25° C. at a relative humidity of 59% for a predetermined time was measured, and the mass of the substrate with the coating film after removing a solvent by heat drying was measured. The heat drying was carried out under a condition of heating by a hot plate at 100° C. for 5 minutes and in an oven at 180° C. for 60 minutes.

Specifically, the mass (C g) of the substrate with the coating film after being left for 10 minutes, the mass (D g) of the substrate with the coating film after being left for 30 minutes and the mass (E g) of the substrate with the coating film after being left for 30 minutes followed by heat drying were measured. Using A to E, the solid content concentration (unit: mass %) was calculated by the following formulae.

Solid content concentration immediately after preparation: (E−A)/(B−A)×100

Solid content concentration after being left for 10 minutes at 25° C. at a relative humidity of 59%: (E−A)/(C−A)×100

Solid content concentration after being left for 30 minutes at 25° C. at a relative humidity of 59%: (E−A)/(D−A)×100

Further, in Table 1, the solid content concentration after being left for 10 minutes at 25° C. at a relative humidity of 59% is represented by "after being left for 10 minutes", and the solid content concentration after being left for 30 minutes at 25° C. at a relative humidity of 59% is represented by "after being left for 30 minutes".

(Change in Viscosity of Composition Over Time)

A calibration curve showing the relationship of the solid content concentration and the viscosity for each composition was preliminarily prepared, and based on the calibration curve, the viscosity after being left for 10 minutes at 25° C. at a relative humidity of 59% and the viscosity after being left for 30 minutes at 25° C. at a relative humidity of 59% were obtained by calculation.

The viscosity immediately after preparation corresponds to the viscosity at the time of supplying a plate printing composition contained in a container to plate printing.

The viscosity (in Table 1, represented by "after being left for 10 minutes") of the composition after being left for 25° C. at a relative humidity of 59% or the viscosity (in Table 1, represented by "after being left for 30 minutes") of the composition after being left for 30 minutes at a relative humidity of 59% corresponds to the viscosity at a time of forming convexes and concaves on a surface of a coating film by means of a bar coater after leaving the composition for 10 minutes or 30 minutes after the coating in the above-described method for evaluating the flatness.

Ex. 1

7 g of a fluorinated copolymer (1) and 107 g of a compound (1) were added in a 200 mL eggplant flask made of glass, followed by stirring at 50° C. for 24 hours to obtain a composition. Regarding the obtained composition, the flatness of the film surface, the solid content concentration, the viscosity and the surface roughness (Pa) of a printed film were evaluated by the above-described evaluation methods. Results are shown in Table 1.

Ex. 2 to 8

The composition was obtained in the same manner as in Ex. 1, except that the type and the used amount of the fluorinated solvent and preparation conditions (temperature and time (h)) were changed, and the flatness of a film surface, the solid content concentration, the viscosity and the surface roughness (Pa) of a printed film were evaluated. Results are shown in Table 1.

TABLE 1

| Ex. | Fluorinated solvent | Composition ||||| Content of fluorinated polymer [mass %] |||
|---|---|---|---|---|---|---|---|---|
| | | Boiling point of fluorinated solvent [° C.] | Amount of fluorinated polymer [g] | Amount of fluorinated solvent [g] | Preparation condition | Immediately after preparation (measured value) | After being left for 10 minutes (measured value) | After being left for 30 minutes (measured value) |
| 1 | Compound (1) | 215 | 7 | 107 | 50° C. × 24 h | 6.1 | 6.5 | 7.7 |
| 2 | Compound (2) | 244 | 4 | 90 | 50° C. × 30 h | 4.3 | 4.6 | 4.7 |
| 3 | Compound (1) | 215 | 9 | 91 | 50° C. × 48 h | 8.8 | — | — |
| 4 | Compound (2) | 244 | 9 | 91 | 50° C. × 72 h | 8.8 | — | — |
| 5 | Perfluorotributylamine | 178 | 9 | 91 | 50° C. × 30 h | 8.6 | 11 | 36.2 |
| 6 | Perfluorotributylamine | 178 | 6 | 94 | 50° C. × 30 h | 5.8 | 8 | 46.2 |
| 7 | Perfluorotributylamine | 178 | 4 | 96 | 50° C. × 30 h | 4.3 | 4.8 | 28 |
| 8 | Perfluorotripentylamine | 218 | 7 | 109 | 50° C. × 24 h | 6.0 | 6.1 | 6.3 |

| Ex. | Viscosity of composition [mPa·s] ||| Flatness of film surface (difference in level [μm]) || Surface roughness Pa of printed film [nm] |
|---|---|---|---|---|---|---|
| | Immediately after preparation (measured value) | After being left for 10 minutes (calculated value) | After being left for 30 minutes (calculated value) | After being left for 10 minutes | After being left for 30 minutes | |
| 1 | 350 | 424 | 673 | 0 | 0 | 4.0 |
| 2 | 340 | 488 | 508 | 0 | 0 | 5.4 |
| 3 | 1,088 | — | — | 1.39 | — | 12.9 |
| 4 | 2,817 | — | — | 0.68 | — | — |
| 5 | 321 | 1,063 | $1.02 \times 10^8$ | 1.49 | — | 29.7 |
| 6 | 94 | 272 | $9.64 \times 10^9$ | 0 | 0.99 | 9.9 |
| 7 | 40 | 63.3 | $2.44 \times 10^6$ | 0 | 0.74 | — |
| 8 | 476 | 534 | 620 | 0 | 0 | 5.5 |

It is evident from the results in Table 1 that in Ex. 1, 2 and 8 where the boiling point of the fluorinated solvent and the viscosity of the present composition were within the range of the present invention, the flatness of the solidified film surface was excellent in both cases where the time of leaving the substrate with the coating at room temperature before forming irregularities on the coating film (hereinafter also referred to "leaving time of coating film") was 10 minutes and 30 minutes. Further, in Ex. 1, 2 and 8, Pa of the printed film was small, and the flatness of the printed film was excellent. In Ex. 1, 2 and 8, the change in the viscosity of the composition over time was small.

On the other hand, in Ex. 3 and 4 where the viscosity of the present composition immediately after preparation exceeded 1,000 mPa·s, the difference in level resulted on a solidified film surface when the leaving time of the coating film was 10 minutes. Pa of the printed film in Ex. 3 was larger than that in Ex. 1, 2 and 8, and the flatness of the printed film was insufficient.

In Ex. 5 to 7 where the boiling point of the fluorinated solvent was lower than the range of the present invention, the change in the viscosity of the composition over time was large. In Ex. 5, the difference in level resulted on the solidified film surface when the leaving time was 10 minutes. In Ex. 6 and 7, a flat solidified film was obtained when the leaving time was 10 minutes, however, when the leaving time was 30 minutes, the difference in level resulted on a solidified film surface. Pa of the printed films in Ex. 5 and 6 was larger than that in Ex. 1, 2 and 8, and the flatness of the printed film was insufficient.

This application is a continuation of PCT Application No. PCT/JP2017/004977, filed on Feb. 10, 2017, which is based upon and claims the benefit of priority from Japanese Patent Application No. 2016-033471 filed on Feb. 24, 2016. The contents of those applications are incorporated herein by reference in their entireties.

What is claimed is:

1. A coating liquid composition, comprising:
a fluororesin having an aliphatic ring in the main chain; and
a fluorinated solvent comprising a compound having at least two fluorocycloalkane rings, and having a boiling point of at least 185° C.,
wherein the coating liquid composition has a viscosity of at most 1,000 mPa·s at 25° C. after being left for thirty minutes after preparation.

2. The coating liquid composition according to claim 1, wherein the aliphatic ring is a fluorinated aliphatic ring.

3. The coating liquid composition according to claim 1, wherein the aliphatic ring is a perfluoro-aliphatic ring.

4. The coating liquid composition according to claim 1, wherein the fluororesin is a polymer comprising units based on a cyclic fluorinated monomer, of which at least one carbon atom constituting ring is a carbon atom constituting a carbon-carbon unsaturated double bond.

5. The coating liquid composition according to claim 1, wherein the fluororesin is a polymer having units formed by cyclopolymeiizing a cyclopolymerizable diene-type fluorinated monomer.

6. The coating liquid composition according to claim 5, wherein the cyclopolymerizable diene-type fluorinated monomer comprises at least one selected from the group consisting of perfluoro(3-butenyl vinyl ether), perfluoro(allyl vinyl ether), perfluoro(3,5-dioxaheptadiene), and perfluoro(3,5-dioxa-4,4-dimethylheptadiene).

7. The coating liquid composition according to claim 5, wherein the cyclopolymerizable diene-type fluorinated monomer is perfluoro(3-butenyl vinyl ether).

8. The coating liquid composition according to claim 1, wherein the fluororesin is a fluorinated polymer having no hydrogen atom bonding to a carbon atom.

9. The coating liquid composition according to claim 1, wherein the compound in the fluorinated solvent has at least three fluorocycloalkane rings.

10. The coating liquid composition according to claim 1, wherein the compound in the fluorinated solvent has no hydrogen atom bonding to a carbon atom.

11. The coating liquid composition according to claim 1, which is a coating liquid composition to be applied by a plate printing method.

12. A plate printing method, comprising:
forming a film of the coating liquid composition of claim 1 on a plate; and
transferring the film onto a substrate.

13. A process for producing an article provided with a film, comprising:
forming a film of the coating liquid composition of claim 1 on a substrate by a plate printing method; and subsequently
removing the fluorinated solvent from the film.

14. The process according to claim 13, wherein the plate printing method is a flexo printing method, an offset printing method, a gravure printing method or a screen printing method.

15. The coating liquid composition according to claim 1, wherein the fluorinated solvent has a boiling point of at least 210° C.

16. The coating liquid composition according to claim 1, wherein the compound in the fluorinated solvent is at least one selected from the group consisting of Compounds (1) to (4), (6), and (8) to (10):

17. The coating liquid composition according to claim 1, wherein the compound in the fluorinated solvent is at least one selected from the group consisting of Compounds (1) and (2):

18. The coating liquid composition according to claim 1, wherein the coating liquid composition has a viscosity of at most 800 mPa·s at 25° C. after being left for thirty minutes after preparation.

19. The coating liquid composition according to claim 1, wherein the coating liquid composition has a viscosity of at most 700 mPa·s at 25° C. after being left for thirty minutes after preparation.

20. The coating liquid composition according to claim 1, wherein a solid content concentration of the coating liquid composition is from 1 to 20 mass %.

* * * * *